US008185455B2

(12) United States Patent
Legro et al.

(10) Patent No.: US 8,185,455 B2
(45) Date of Patent: May 22, 2012

(54) AUDITING SYSTEM WITH INTERACTIVE RULE CONSTRUCTION USER INTERFACE

(75) Inventors: Euly Legro, Benicia, CA (US); Gideon Juve, San Ramon, CA (US); Kin Chan, Danville, CA (US); Jorge Pastoral, Jr., Pleasant Hill, CA (US); Robert Rich, Pleasanton, CA (US); Kelly Stephenson, St. Ann, MO (US); Jack Fine, Benicia, CA (US); Michael L. Peterson, San Mateo, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1595 days.

(21) Appl. No.: 11/241,763

(22) Filed: Sep. 30, 2005

(65) Prior Publication Data

US 2007/0088639 A1 Apr. 19, 2007

(51) Int. Cl.
*G07F 19/00* (2006.01)
*H04M 15/00* (2006.01)

(52) U.S. Cl. ..................... 705/34; 379/114.04; 717/124; 706/50

(58) Field of Classification Search ........................ None
See application file for complete search history.

(56) References Cited

U.S. PATENT DOCUMENTS

| | | | | | |
|---|---|---|---|---|---|
| 5,504,840 | A | * | 4/1996 | Hiji et al. | 706/61 |
| 5,530,861 | A | * | 6/1996 | Diamant et al. | 705/8 |
| 5,689,668 | A | * | 11/1997 | Beaudet et al. | 715/841 |
| 5,758,031 | A | * | 5/1998 | De Silva | 706/47 |
| 6,625,499 | B2 | * | 9/2003 | Abdalla | 700/25 |
| 6,678,669 | B2 | * | 1/2004 | Lapointe et al. | 706/15 |
| 6,687,335 | B1 | * | 2/2004 | Jones et al. | 379/1.01 |
| 6,772,135 | B2 | * | 8/2004 | Sullivan | 706/47 |
| 6,934,696 | B1 | * | 8/2005 | Williams et al. | 706/47 |
| 7,085,360 | B1 | * | 8/2006 | Sprouse | 379/114.04 |
| 7,139,369 | B2 | * | 11/2006 | Martin et al. | 379/88.16 |
| 7,581,194 | B2 | * | 8/2009 | Iwema et al. | 715/810 |
| 7,627,891 | B2 | * | 12/2009 | Williams et al. | 726/1 |
| 7,725,728 | B2 | * | 5/2010 | Ama et al. | 713/181 |
| 2004/0153382 | A1 | * | 8/2004 | Boccuzzi et al. | 705/34 |
| 2005/0080821 | A1 | * | 4/2005 | Breil et al. | 707/104.1 |
| 2007/0180490 | A1 | * | 8/2007 | Renzi et al. | 726/1 |

* cited by examiner

*Primary Examiner* — Luna Champagne
(74) *Attorney, Agent, or Firm* — Toler Law Group, PC

(57) ABSTRACT

A system for auditing telecommunication billing data comprises a rule-construction user interface and an audit component. The rule-construction user interface comprises a plurality of rule condition parameter menus to construct an audit rule for at least one telecommunication billing attribute. In a particular embodiment, before baselining the audit rule, a user can test rule conditions against actual data, and the user can compare multiple versions of a single audit rule to determine which version successfully identifies exceptions. The audit component is to perform an audit of a telecommunication billing data set for exceptions to the audit rule constructed using the rule-construction user interface. Once identified, the exceptions can be assigned to additional tool users to assist in exception investigation and maintenance using an exception maintenance component.

30 Claims, 9 Drawing Sheets

| LEVEL | VALUE | USOC INPUT | FID INPUT | PRODUCT INPUT | LEG OPTIONS | OPERATOR OPTIONS |
|---|---|---|---|---|---|---|
| ASG | FID | N | Y | N | N | Normal |
| | FID Qty | N | Y | N | N | Normal |
| ASG USOC | USOC | N | N | N | N | Normal |
| | USOC Qty | Y | N | N | N | Numeric |
| | USOC Any Rate | Y | N | N | N | Numeric |
| | USOC Billed Rate | Y | N | N | N | Numeric |
| | USOC Fixed Rate | Y | N | N | N | Numeric |
| | USOC Variable Rate | Y | N | N | N | Numeric |
| | USOC FID | Y | Y | N | N | Normal |
| | USOC FID Qty | Y | Y | Y | N | Numeric |
| Circuit | Circuit ID | N | N | N | N | Normal |
| | BAN | N | N | N | N | Normal |
| | ACNA | N | N | N | N | Normal |
| | Class of Service | N | N | N | N | Normal |
| | CLF | N | N | N | N | Normal |
| | CLLI | N | N | N | N | Normal |
| | CLS | N | N | N | N | Normal |
| | IOC | N | N | N | N | Normal |
| | NC Code | N | N | N | N | Normal |
| | NCI Code | N | N | N | N | Normal |
| | FID | N | Y | N | N | Normal |
| | FID Qty | N | Y | Y | N | Numeric |

FIG. 3A

| LEVEL | VALUE | USOC INPUT | FID INPUT | PRODUCT INPUT | LEG OPTIONS | OPERATOR OPTIONS |
|---|---|---|---|---|---|---|
| Circuit USOC | USOC | N | N | N | N | Normal |
| | USOC Qty | Y | N | N | N | Numeric |
| | USOC Any Rate | Y | N | N | N | Numeric |
| | USOC Billed Rate | Y | N | N | N | Numeric |
| | USOC Fixed Rate | Y | N | N | N | Numeric |
| | USOC Variable Rate | Y | N | N | N | Numeric |
| | USOC FID | Y | Y | N | N | Normal |
| | USOC FID Qty | Y | Y | Y | N | Numeric |
| Circuit Leg | CKL | N | N | N | Y | Normal |
| | CKLT | N | N | N | Y | Normal |
| | CFA | N | N | N | Y | Normal |
| | EC | N | N | N | Y | Normal |
| | LSOC | N | N | N | Y | Normal |
| | V-H Coordinates | N | N | N | Y | Normal |
| | POI | N | N | N | Y | Normal |
| | FID | N | Y | N | Y | Normal |
| | FID Qty | N | Y | Y | Y | Numeric |
| | NCI Code Quantity | Y (as NCI position) | Y | Y | Y | Numeric |

FIG. 3B

| LEVEL | VALUE | USOC INPUT | FID INPUT | PRODUCT INPUT | LEG OPTIONS | OPERATOR OPTIONS |
|---|---|---|---|---|---|---|
| Circuit Leg USOC | USOC | N | N | N | Y | Normal |
| | USOC Qty | Y | N | N | Y | Numeric |
| | USOC Any Rate | Y | N | N | Y | Numeric |
| | USOC Billed Rate | Y | N | N | Y | Numeric |
| | USOC Fixed Rate | Y | N | N | Y | Numeric |
| | USOC Variable Rate | Y | N | N | Y | Numeric |
| | USOC FID | Y | Y | N | Y | Normal |
| | USOC FID Qty | Y | Y | Y | Y | Numeric |

FIG. 3C

| LEG Drop-Down | LEG NUMBER INPUT |
|---|---|
| Any Leg | N |
| Leg | Y |
| CKL | Y |
| CKLT | Y |
| Last Leg | N |
| Last CKL | Y (greater than) |
| Last CKLT | Y (greater than) |

FIG. 4

| TYPE | OPERATOR Drop-Down | RIGHT HAND SIDE | FORMAT |
|---|---|---|---|
| Normal | exists | NONE | N/A |
| | in | Input Box | Comma separated list with regular expression matching and list replacement |
| | equals | Same as Left | N/A |
| Numeric | exists | NONE | N/A |
| | in | Input Box | Comma separated list with regular expression matching and list replacement |
| | less than | Input Box | Number |
| | greater than | Input Box | Number |
| | in range | Input Box | Low,High |
| | equals mileage | 2 Input Boxes | Leg 1, Leg 2 |

FIG. 5

AUDITING SYSTEM WITH INTERACTIVE RULE CONSTRUCTION USER INTERFACE

FIELD OF THE DISCLOSURE

The present disclosure relates to methods and systems for auditing telecommunication billing data.

BACKGROUND

Telecommunication billing data is audited to ensure that telecommunication use has been accurately billed. U.S. Patent Application Publication Nos. 2002/0082991 A1 and 2004/0153382 A1 disclose various methods and systems for auditing telecommunication billing data.

BRIEF DESCRIPTION OF THE DRAWINGS

The present disclosure is pointed out with particularity in the appended claims. However, other features are described in the following detailed description in conjunction with the accompanying drawings in which:

FIGS. 3A-3C are tables indicating logic for providing menu options and input boxes in an embodiment of the rule-construction user interface;

FIG. 4 is a table indicating logic for providing a leg number input box based on a user-selected option from a leg drop-down menu;

FIG. 5 is a table indicating logic for providing menu options and input boxes based on an operator type in an embodiment of the rule-construction user interface;

DETAILED DESCRIPTION OF THE DRAWINGS

Disclosed herein are embodiments of a tool to create billing audit rules to analyze complex circuit structures to find errors and discrepancies. Incorrect circuit attributes created in a billing database may be caused by insufficient edit checks when processing and posting account service order activities or embedded base charges, for example.

The tool has a rule-construction user interface for users to interactively and dynamically construct billing audit rules. The rule-construction user interface may comprise particular drop-down menus that facilitate interactive construction of potentially-complex billing audit rules. Further, the rule-construction user interface enables identification of particular access service groups (ASGs), circuits, sub-circuits (e.g. legs), Universal Service Order Codes (USOCs), values and billing charges when constructing the billing audit rules. Still further, the rule-construction user interface assists in pinpointing errors by enabling the creation of rules that compare a value on a circuit with either another value on the circuit or a user-entered value. Yet still further, the rule-construction user interface supports a mileage calculation, coordinate comparisons, pattern matching, NCI code analysis, and keyed list substitutions.

The tool enables testing of a billing audit rule by running it against a data file of embedded account attributes. If acceptable results are returned, a run with the billing audit rule is baselined or the user can baseline the rule without baselining the test run results. Testing a billing audit rule may include running one or two versions of the same set of rules to detect and eliminate false positives. The billing audit rules can be stored and reused for testing and baselining purposes.

Based on the billing audit rules, extracted embedded-base billing data for existing telecommunication circuits are examined for proper billing attributes. Exceptions to the billing audit rules, which may represent instances of misbilling, are identified and reported. The tool enables work flow management of the exceptions between multiple access service centers (ASCs).

The tool also provides automated reporting of revenue impacts from the rule exceptions. The identified exceptions can be used in revenue assurance and revenue recovery applications.

Thus, the tool provides an automated method of building business rules via a requirements discovery process that allows for an audit of circuit billing rules and attributes. Further, the tool may provide user administration functions and an interactive generic capability to set rule parameters on a chunk of data by using character patterns. The application is portable to any billing system where an embedded data source can be established for account, circuit or circuit-leg-level validation. For example, the application may be used in an industry market carrier access billing platform, a retail billing platform, and other billing platforms.

Figure 1:
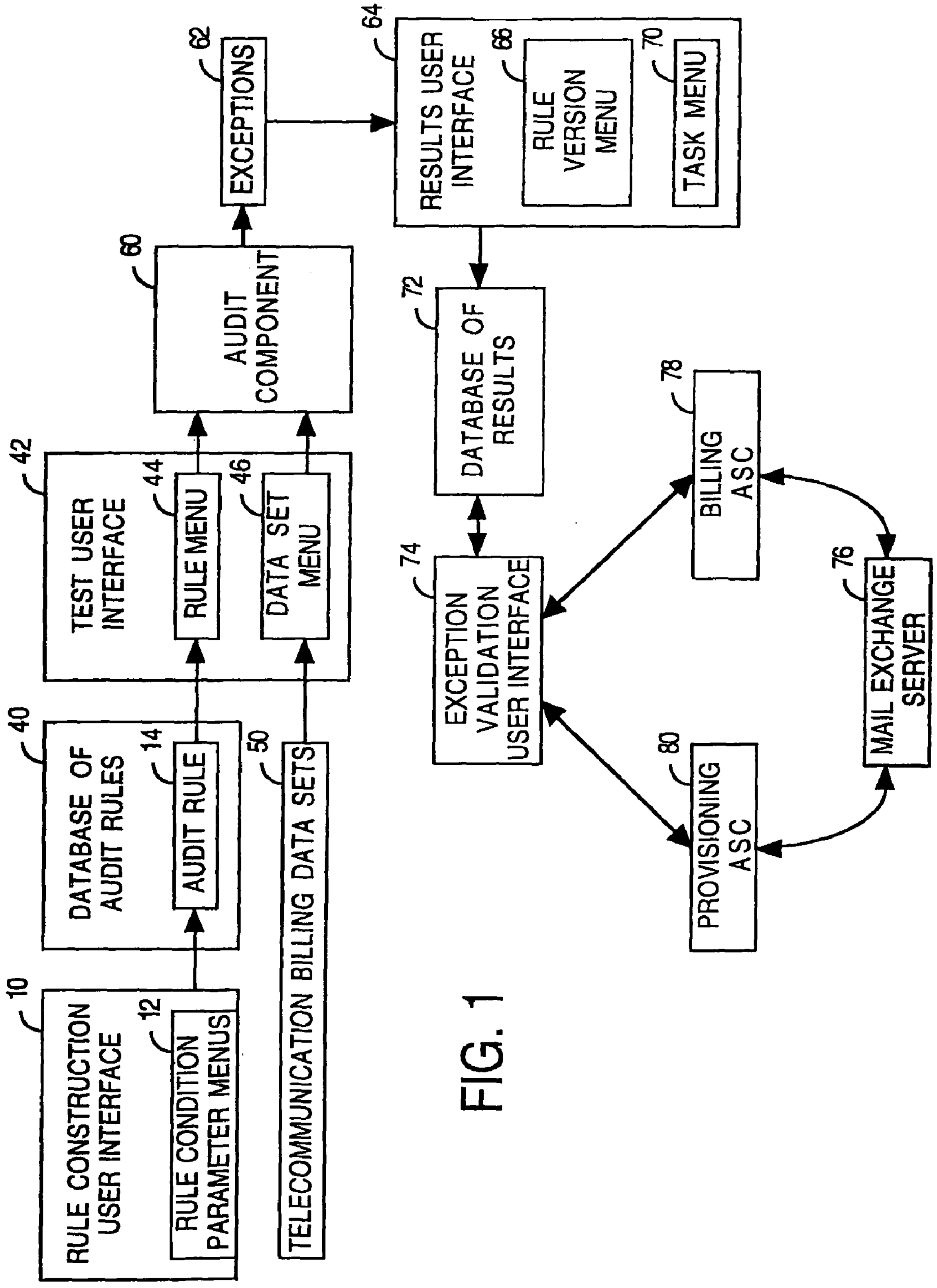
FIG. 1 is a block diagram of an embodiment of a system for auditing telecommunication billing data.

FIG. 1 is a block diagram of an embodiment of a system for auditing telecommunication billing data. The system comprises a rule-construction user interface 10. The rule-construction user interface 10 comprises rule condition parameter menus 12 to construct an audit rule 14 for at least one telecommunication billing attribute. The rule condition parameter menus 12 have drop-down menu structures that enable end users to create complex billing audit rules.

In general, each audit rule comprises one or more conditions. Each condition may be constructed using one or more of a condition part, a left-hand side clause, an operator and a right-hand side clause.

Figure 2:
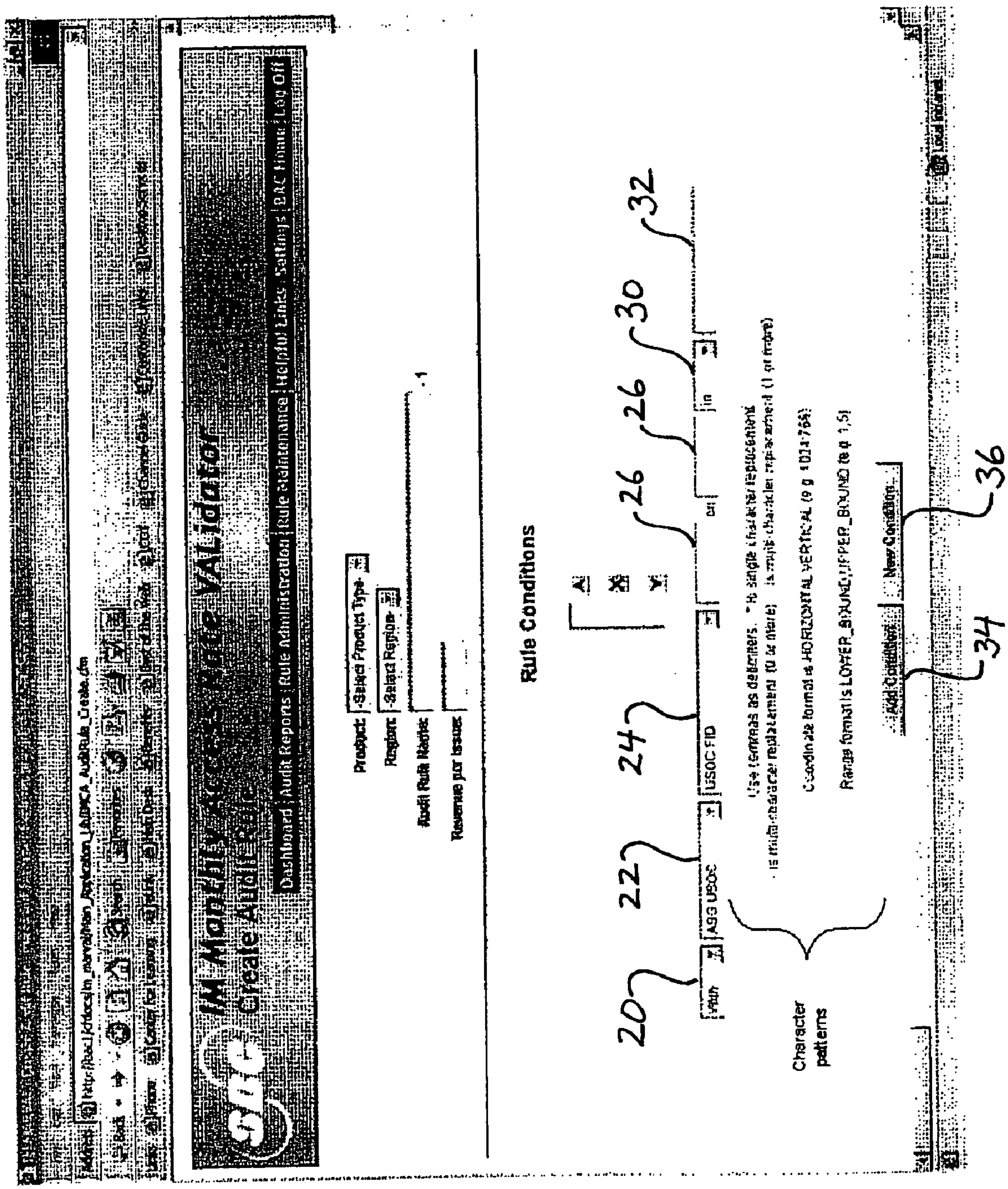
FIG. 2 is a screen shot of an embodiment of a rule-construction user interface.

FIG. 2 is a screen shot of an embodiment of the rule-construction user interface 10. The rule-construction user interface 10 comprises a condition drop-down menu 20 to receive a user selection of a condition parameter of a rule condition of the audit rule 14. The condition drop-down menu 20 includes a "with" option and a "without" option. Using the condition drop-down menu 20, the user constructs the condition part of the rule condition.

The rule-construction user interface 10 further comprises a level drop-down menu 22 and a value drop-down menu 24 for users to construct the left-hand side clause of the rule condition. The level drop-down menu 22 includes an Access Service Group (ASG) option, an ASG Universal Service Order Code (USOC) option, a circuit option, a circuit USOC option, a circuit leg option and a circuit leg USOC option. The value drop-down menu 24 displays user-selectable options that depend on which option in the level drop-down menu 22 has been user-selected.

If the ASG option is selected from the level drop-down menu 22, then the value drop-down menu 24 includes a field identifier (FID) option and an FID quantity option.

If the circuit option is selected from the level drop-down menu 22, then the value drop-down menu 24 includes a circuit ID option, a billing account number (BAN) option, an access customer name abbreviation (ACNA) option, a class of service option, a common language facility (CLF) option, a common language location identifier (CLLI) option, a common language circuit identification serial number format (CLS) option, an Inter-Office Code (IOC) option, a network channel (NC) code option, a network channel interface (NCI) code option, an FID option, and an FID quantity option.

If the circuit leg option is selected from the level drop-down menu 22, then the value drop-down menu 24 includes a circuit location (CKL) option, a circuit location telephone company wire center (CKLT) option, a connecting facility assignment (CFA) option, an exchange company indicator (EC) option, a local serving office wire center CLLI code (LSOC) option, a vertical-horizontal (V-H) coordinates option, a point of interface (POI) option, an FID option, an FID quantity option, and an NCI code quantity option.

If either the ASG USOC option, the circuit USOC option or the circuit leg USOC option is selected from the level drop-down menu 22, then the value drop-down menu 24 includes a USOC option, a USOC quantity option, a USOC any-rate option, a USOC billed-rate option, a USOC fixed-rate option, a USOC variable-rate option, a USOC FID option, and a USOC FID quantity option.

The rule-construction user interface 10 further comprises at least one input box 26 that is presented to the user based on which options have been user-selected in the level drop-down menu 22 and the value drop-down menu 24. The at least one input box 26 may comprise up to three input boxes to receive any combination of a USOC input value, an FID input value and a product input value. The specific combination of input boxes presented for each possible level/value option combination is shown is FIGS. 3A-3C. The at least one input box 26 is usable to construct the left-hand side clause.

The rule-construction user interface 10 may further comprise a leg drop-down menu (not illustrated) if either the circuit leg option or the circuit leg USOC option is user-selected from the level drop-down menu 22. The leg drop-down menu includes an any-leg option, a leg option, a CKL option, a CKLT option, a last-leg option, a last-CKL option and a last-CKLT option. Based on which option is user-selected from the leg drop-down menu 22, the rule construction user interface 10 may further comprise a leg number input box (not illustrated). The leg number input box is presented if either the leg option, the CKL option, the CKLT option, the last CKL option or the last CKLT option is user-selected. FIG. 4 is a table indicating the logic for providing the leg number input box based on a user-selected option from the leg drop-down menu. The leg drop-down menu and the leg number input box are usable to construct the left-hand clause.

Referring back to FIG. 2, the rule-construction user interface 10 further comprises an operator drop-down menu 30. The operator drop-down menu 30 is used to construct the operator of the rule condition.

The options presented in the operator drop-down menu 30 are based on which options have been user-selected in the level drop-down menu 22 and the value drop-down menu 24. The options can be characterized as being either normal options or numeric options. FIGS. 3*a*-3*c* show whether the normal options or the numeric options are provided in the operator drop-down menu 30 for each possible level/value option combination.

FIG. 5 is a table indicating the various options in the operator drop-down menu 30. The normal options include an "exists" option, an "in" option, and an "equals" option. The numeric options include an "exists" option, an "in" option, a "less-than" option, a "greater-than" option, an "in-range" option, and an "equals-mileage" option.

Based on which option is user-selected in the operator drop-down menu 30, the rule-construction user interface 10 may further comprise one or more drop-down menus and/or one or more input boxes 32 for constructing a right-hand side clause of the rule condition. Logic for providing the right-hand side user interface elements are also shown in FIG. 5.

If the "exists" option is user-selected from the operator drop-down menu 30, then no right-hand side user interface is included in the rule-construction user interface 10.

If the "in" option is user-selected from the operator drop-down menu 30, then the right-hand side user interface comprises an input box. The input box is receptive to a user input of a comma-separated or other delimiter-separated list with regular expression matching and list replacement. A single character replacement may be represented by a first symbol such as "*". A replacement of zero or more characters may be represented by a second symbol such as "~". A replacement of one or more characters may be represented by a third symbol such as "^".

If the "equals" option is user-selected from the operator drop-down menu 30, then the right-hand side user interface is the same as the left-hand side user interface. In this case, the right-hand side user interface enables the creation of a rule condition that compares a value on a circuit with another value on the circuit.

If either the "less-than" option or the "greater-than" option is user-selected from the operator drop-down menu 30, then the right-hand side user interface comprises an input box. The input box is receptive to a user input of a numeric value.

If the "in-range" option is user-selected from the operator drop-down menu 30, then the right-hand side user interface comprises an input box. The input box is receptive to a user input of a lower value and an upper value, separated by a comma or another delimiter, to define the range.

If the "equals-mileage" option is user-selected from the operator drop-down menu 30, then the right-hand side user interface comprises two input boxes. A first input box is receptive to a user input of a first leg value, and a second input box is receptive to a user input of a second leg value. The "equals-mileage" option is used to create a rule condition based on a mileage calculation.

Inputs made by the various menus and input boxes of the rule-construction user interface 10 are concatenated to construct a rule condition. Referring back to FIG. 2, the rule-construction user interface 10 may include an add-condition button 34 to add the constructed rule condition to the audit rule 14. The rule-construction user interface 10 may include a new-condition button 36 to indicate that a new rule condition is to be constructed. The various drop-down menus can be reset to default values in response to a user selection of the new-condition button 36. For example, the level drop-down menu 22 may display "-Select Level-" and the value drop-down menu 24 may display "-Select Value-" after the user selection of the new-condition button 36. In this way, users can interactively construct one or more rule conditions to include in the audit rule 14.

Referring back to FIG. 1, the audit rule 14 can be stored in a database 40 of audit rules constructed using the rule-construction user interface 10. The audit rules may comprise multiple versions of the same rule, where each version, although constructed differently, is a theoretical attempt to detect the same particular exceptions.

A test user interface 42 allows any of the audit rules in the database 40 to be tested. The test user interface 42 comprises a rule menu 44 of the audit rules stored in the database 40. The rule menu 44 is receptive to user selections of which audit rule(s) are to be tested.

The test user interface 42 comprises a data set menu 46 of a plurality of telecommunication billing data sets 50. The data set menu 46 is to receive a user selection of which telecommunication data set(s) is to be examined based on the user-selected audit rule(s).

The telecommunication billing data sets 50 may be produced by an extraction process from a main embedded-base master file. The extracted feed is loaded into and stored by a database that provides the telecommunication billing data sets 50. The extraction process assists in running the billing audit rules against very large files.

Figure 6:
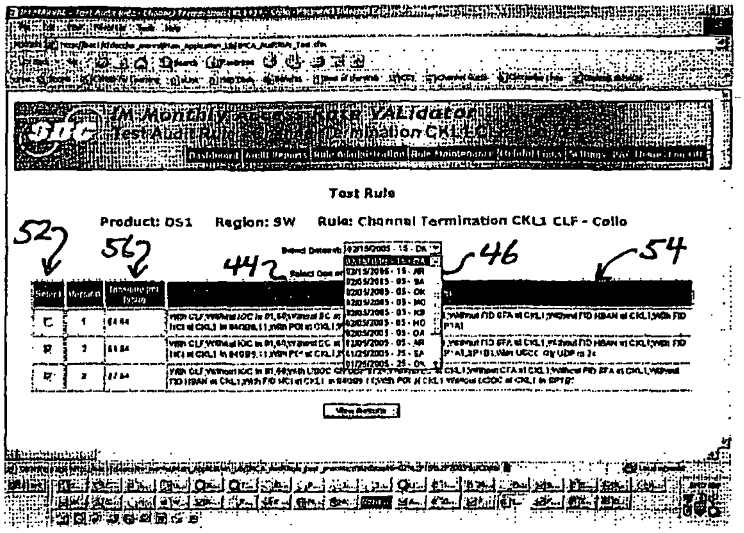
FIG. 6 is a screen shot of an embodiment of a test user interface.

FIG. 6 is a screen shot of an embodiment of the test user interface 42. The rule menu 44 and the data set menu 46 are embodied by drop down menus in this embodiment. The test user interface 42 includes controls 52, such as check boxes, for users to select which versions of a selected audit rule are to be tested. The test user interface 42 displays an associated description 54 and an associated revenue-per-issue 56 for each version of the selected audit rule.

Referring back to FIG. 1, consider a user selecting the audit rule 14 from the rule menu 44, and selecting a particular telecommunication billing data set from the data set menu 46. An audit component 60 performs an audit of the particular telecommunication billing data set for exceptions 62 to the audit rule 14. The exceptions 62 are displayed by at least one results user interface 64.

In general, the audit component 60 performs the audit based on a user selection of one or more audit rules/versions from the rule menu 44 and a user selection of a telecommunication billing data set from the data set menu 46.

Figure 7:
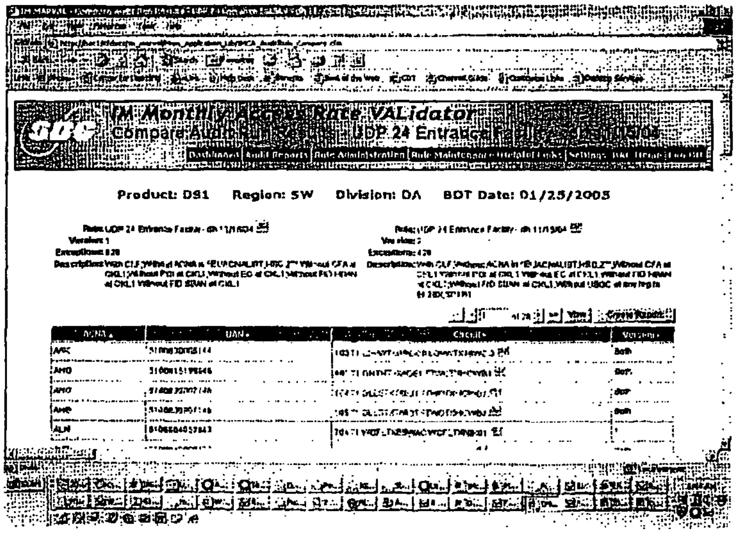
FIG. 7 is a screen shot of an embodiment of a results user interface.

FIG. 7 is a screen shot of an embodiment of the results user interface 64. The results user interface 64 summarizes which audit rule and versions were tested, a number of exceptions detected for each audit rule/version, and a description of each audit rule/version. The results user interface 64 details each of the exceptions 62 that were detected. For each exception, an indication of which version(s) detected the exception is displayed.

Using the results user interface 64, the user can identify and select which version of the audit rule 14 is most accurate in detecting particular exceptions of interest. The exceptions displayed by the results user interface 64 are reviewed by the user to find a version that detects all desired exceptions, but does not produce false positives.

If some exceptions are not detected and/or some false positives are produced, the user can refine the best version (or any version) of the audit rule 14 using the rule-construction user interface 10. One or more subsequent audit tests can be performed until a version of the audit rule 14 has been constructed to produce the desired results.

Figure 8:
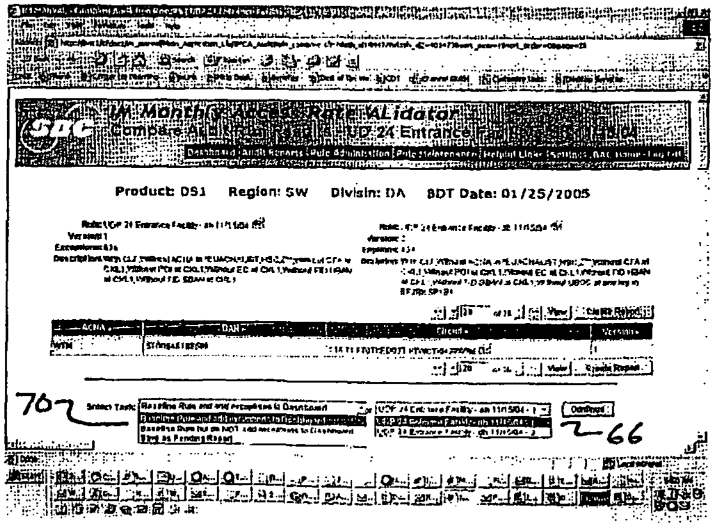
FIG. 8 is an embodiment of another page of the results user interface.

FIG. 8 is an embodiment of another page of the results user interface 64. The results user interface 64 comprises a rule/version menu 66 and a task menu 70. The rule/version menu 66 enables the user to select one of the tested rules/versions (e.g. the most accurate one). The task menu 70 provides user-selectable options to perform a task based on the rule/version selected from the rule/version menu 66. The task may comprise a first task to baseline the rule/version and add exceptions to a dashboard, a second task to baseline the rule/version but not add the exceptions to the dashboard, and a third task to save as a pending report. The dashboard may be any main user interface where data is loaded and results and user options are presented.

Referring back to FIG. 1, the results can be saved in a database 72. An exception validation user interface 74 enables users to perform embedded base validations of the exceptions detected by the audit component 60 and/or stored in the database 72. Users may log on to gain access to the user interface 74 via an intranet, an extranet, an internet or another computer network.

The users may send any of the exceptions 62 for further validation or for completion to one or more other users. For instance, a user at a first ASC may send one or more exceptions to another user at a second ASC. Communication between users at ASCs may be performed using a mail-exchange server 76.

For example, an exception initially worked in a billing ASC 78 may be sent for completion to a provisioning ASC 80 because the exception needs a correcting service order. Another example is an exception initially worked in the provisioning ASC 80 being sent to the billing ASC 78 because the exception needs an adjustment to be created by the billing ASC 78.

The user interface 74 enables users to enter information associated with each exception such as a root cause, causing service order information, action taken, and comments/notes. A supervisory-level tool user can categorize or group like exceptions for assignment to an exception validator-owner. The exception validator-owner can use the user interface 74 to enter appropriate information for each exception as assigned to the user. The supervisory-level user can re-assign exceptions amongst groups of exception validator-owners for workload balancing.

Service orders and/or adjustments created to correct an exception determined to be a true positive or a misbilling are entered and stored in the tool. The tool processes this information to extract mechanically the associated revenues for each correcting action. The revenues that are extracted can include a Monthly Recurring Charge (MRC) which will enable annualized revenue reporting, Other Charges and Credit (OCC) for back billing, and Adjustments. The extracted revenues are stored in the tool for management reporting. A mechanized revenue tracking component can perform these acts.

The herein-disclosed features performed by the tool may be directed by one or more computer processors. In accordance with various embodiments, the features described herein may be implemented as one or more software programs running on the one or more computer processors. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the features disclosed herein.

It is noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Figure 9:
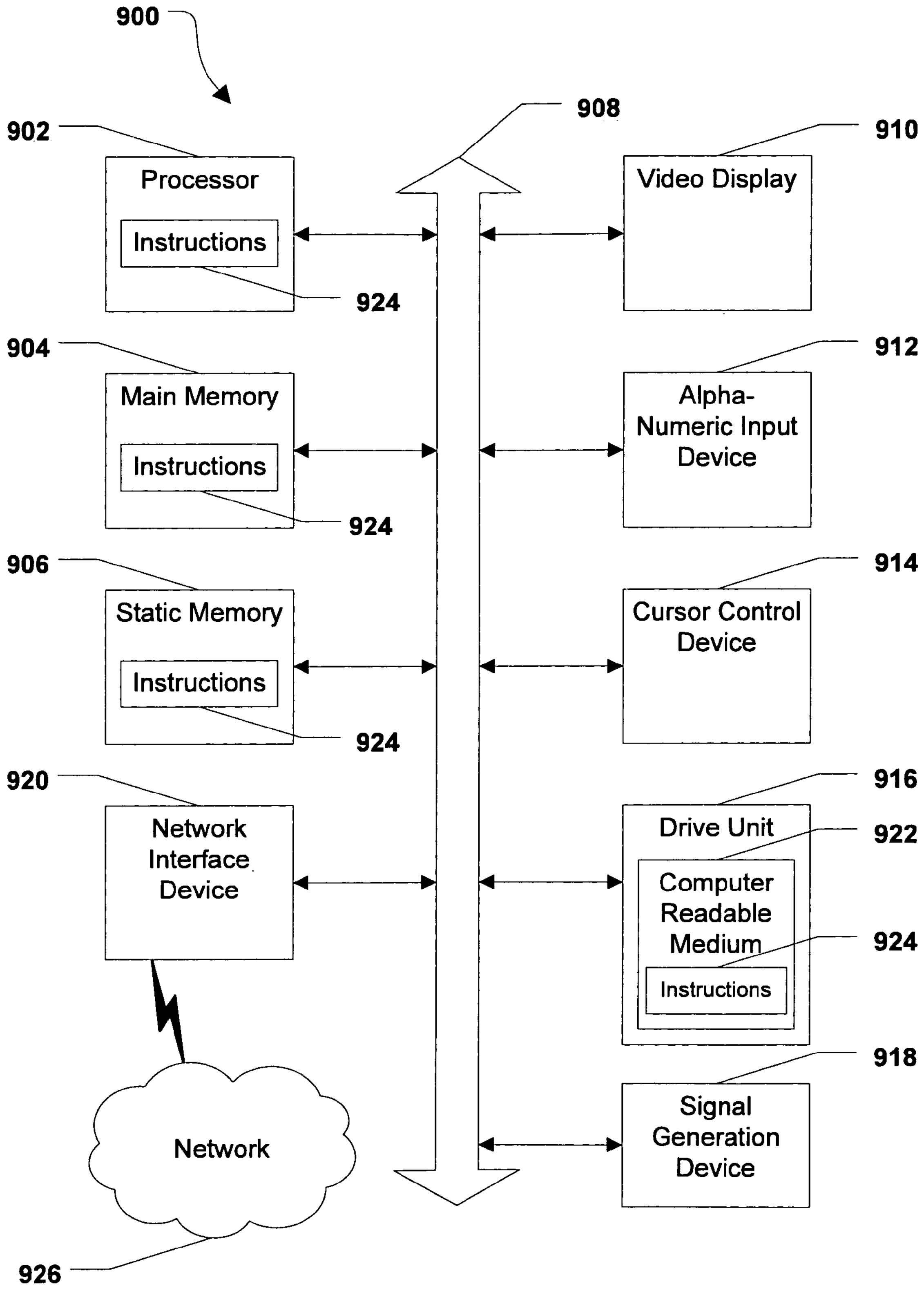
FIG. 9 is a block diagram of an embodiment of a computer.

Referring to FIG. 9, an illustrative embodiment of a general computer system is shown and is designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902, e.g., a central processing unit (CPU), a graphics processing unit (GPU), or both. Moreover, the computer system 900 can include a main memory 904 and a static memory 906, that can communicate with each other via a bus 908. As shown, the computer system 900 may further include a video display unit 910, such as a liquid crystal display (LCD), an organic light emitting diode (OLED), a flat panel display, a solid state display, or a cathode ray tube (CRT). Additionally, the computer system 900 may include an input device 912, such as a keyboard, and a cursor control device 914, such as a mouse. The computer system 900 can also include a disk drive unit 916, a signal generation device 918, such as a speaker or remote control, and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus comprising:

a processor to:

receive a user selection of an audit data set including a plurality of exceptions, wherein each exception of the plurality of exceptions represents an instance of misbilling associated with the audit data set, wherein the audit data set is selected from a plurality of billing data sets, each billing data set of the plurality billing data sets including corresponding billing data that has been extracted by the processor from a database;

apply a first audit rule to audit the audit data set and produce first audit rule results, wherein the first audit rule results identify a first subset of exceptions of the plurality of exceptions within the audit data set;

apply a second audit rule, distinct from the first audit rule, to audit the audit data set and produce second audit rule results, wherein the second audit rule results identify a second subset of exceptions of the plurality of exceptions within the audit data set;

present the first subset of exceptions and the second subset of exceptions to a user via a results user interface; and receive a selection of a particular audit rule, wherein the particular audit rule is one of the first audit rule and the second audit rule, and wherein the particular audit rule is selected based on the first audit rule results and the second audit rule results.

2. The apparatus of claim 1, wherein the first audit rule results include an indication of one or more first false positives that are associated with the audit data set.

3. The apparatus of claim 1, wherein the second audit rule results include an indication of one or more second false positives that are associated with the audit data set.

4. The apparatus of claim 1, wherein the selection of the particular audit rule is based at least in part on a comparison of a count of first false positives that are associated with application of the first audit rule to a count of second false positives that are associated with application of the second audit rule.

5. The apparatus of claim 1, wherein, prior to applying the first audit rule to the audit data set, the processor is to test the first audit rule using a test data file that includes one or more embedded account attributes.

6. The apparatus of claim 1, wherein each exception of the plurality of exceptions is based on an attribute of the audit data set.

7. The apparatus of claim 1, wherein the first audit rule results and the second audit rule results are displayed at a results user interface.

8. The apparatus of claim 1, wherein the selection of the particular audit rule is based at least in part on a comparison of a count of first exceptions of interest to a count of second exceptions of interest, wherein the count of first exceptions of interest is based on the first subset of exceptions and the count of second exceptions of interest is based on the second subset of exceptions.

9. The apparatus of claim 1, wherein the processor is configured to enable the user to modify the particular audit rule to generate a modified audit rule.

10. The apparatus of claim 1, wherein the first audit rule and the second audit rule are constructed by the user.

11. A method comprising:

receiving, at a processor, a selection of a first audit rule;

receiving, at the processor, a selection of a second audit rule;

applying the first audit rule to audit billing data and to produce first audit rule results, wherein the first audit rule results identify a first subset of exceptions of a plurality of exceptions within the billing data, wherein each exception of the plurality of exceptions represents an instance of misbilling associated with the billing data;

applying the second audit rule, distinct from the first audit rule, to audit the billing data and to produce second audit rule results, wherein the second audit rule results identify a second subset of exceptions of the plurality of exceptions within the billing data;

presenting audit results, including the first subset of exceptions and the second subset of exceptions, to a user via a display coupled to the processor, wherein the audit results include one or more indications corresponding to each exception of the first subset of exceptions and the second subset of exceptions, and wherein each indication of the one or more indications specifies which audit rule detected a particular corresponding exception; and after presenting the audit results, receiving, at the processor, a selection of a particular audit rule from the user, wherein the particular audit rule is one of the first audit rule and the second audit rule, and wherein the particular audit rule is selected based on the audit results.

12. The method of claim 11, wherein the particular audit rule is baselined to be applied to future billing data.

13. The method of claim 11, wherein the first audit rule and the second audit rule are each selected from an audit rule menu including a plurality of audit rules.

14. The method of claim 11, further comprising presenting an audit rule menu including a plurality of audit rules, wherein each audit rule of the plurality of audit rules includes a corresponding description and a corresponding checkbox that enables each audit rule to be selected.

15. The method of claim 14, wherein each audit rule of the plurality of audit rules includes a corresponding revenue per issue and wherein the audit rule menu displays the corresponding revenue per issue and the corresponding checkbox for each audit rule.

16. The method of claim 11, wherein each of the plurality of exceptions is associated with a particular attribute of the billing data.

17. The method of claim 11, wherein the first audit rule results and the second audit rule results are displayed at a results user interface.

18. The method of claim 11, wherein the selection of the particular audit rule is based at least in part on a comparison of a count of first exceptions of interest to a count of second exceptions of interest, wherein the count of first exceptions of interest is based on the first set of exceptions and the count of second exceptions of interest is based on the second set of exceptions.

19. The method of claim 11, further comprising receiving a modified audit rule from the user, wherein the modified preferred audit rule is based on the particular audit rule that is modified to reduce a count of false positives.

20. The method of claim 11, wherein the billing data includes a plurality of embedded account attributes and wherein the first audit rule and the second audit rule are each constructed to identify at least one exception of the plurality of exceptions based on a particular embedded account attribute of the plurality of embedded account attributes included in the billing data.

21. A non-transitory computer-readable storage medium including computer executable instructions that, when executed by a processor, cause the processor to:

receive a selection of a first audit rule and a selection of a second audit rule;

apply the first audit rule to audit billing data and to produce first audit rule results;

apply the second audit rule to audit the billing data and to produce second audit rule results, wherein the first audit rule results identify a first subset of exceptions of a plurality of exceptions within the billing data and the second audit rule results identify a second subset of exceptions of the plurality of exceptions within the billing data, and wherein each exception of the plurality of exceptions represents an instance of misbilling associated with the billing data;

display audit results including the first audit rule results and the second audit rule results; and after displaying the first audit rule results and the second audit rule results, receive a selection of a particular audit rule, wherein the selection of the particular audit rule is based on the audit results, and wherein the particular audit rule is one of the first audit rule and the second audit rule.

22. The computer-readable storage medium of claim 21, further comprising instructions to present a first option to select one of the first audit rule and the second audit rule as the particular audit rule.

23. The computer-readable storage medium of claim 22, further comprising instructions to present a second option to validate one of the first subset of exceptions or the second subset of exceptions based at least in part on the selection of the particular audit rule.

24. The computer-readable storage medium of claim 23, further comprising instructions to validate each exception of the first subset of exceptions based on a selection of the second option.

25. The computer-readable storage medium of claim 21, further comprising instructions to test the first audit rule using a test data file that includes one or more embedded account attributes.

26. The computer-readable storage medium of claim 21, wherein the billing data includes telecommunications billing data.

27. The computer-readable storage medium of claim 21, wherein the audit results are displayed at a results user interface.

28. The computer-readable storage medium of claim 21, wherein the selection of the particular audit rule is based at least in part on a comparison of a count of first exceptions of interest to a count of second exceptions of interest, wherein the count of first exceptions of interest is based on the first set of exceptions and the count of second exceptions of interest is based on the second set of exceptions.

29. The computer-readable storage medium of claim 21, further comprising instructions to receive a modified audit rule, wherein the modified audit rule is based on the particular audit rule that is modified to reduce a count of false positives.

30. The computer-readable storage medium of claim 21, wherein the first audit rule and the second audit rule are constructed by a user.

* * * * *